US006843500B2

(12) United States Patent
Li

(10) Patent No.: US 6,843,500 B2
(45) Date of Patent: Jan. 18, 2005

(54) PORTABLE FOLDING WHEELCHAIR

(76) Inventor: Mao-Shun Li, No. 392, Jungjuang, Jungjuang Tsuen, Shueishang Shiang, Chiai (TW)

(*) Notice: Subject to any disclaimer, the term of this patent is extended or adjusted under 35 U.S.C. 154(b) by 116 days.

(21) Appl. No.: 10/393,775

(22) Filed: Mar. 21, 2003

(65) Prior Publication Data

US 2004/0000773 A1 Jan. 1, 2004

(30) Foreign Application Priority Data

Jun. 28, 2002 (TW) ..................................... 02262744 U

(51) Int. Cl.$^{7}$ ............................. B62B 7/08; A47C 4/28

(52) U.S. Cl. ....................... 280/642; 280/647; 280/650; 280/657; 280/250.1; 297/16.1; 297/DIG. 4

(58) Field of Search ................................ 280/642, 644, 280/647, 657, 658, 250.1, 47.38, 47.4; 297/16.1, 16.2, DIG. 4

(56) References Cited

U.S. PATENT DOCUMENTS 2,685,325 A * 8/1954 Webster ....................... 297/30
2,781,225 A * 2/1957 Heideman .................. 280/642
3,248,125 A * 4/1966 Gill .......................... 280/47.4
3,336,039 A * 8/1967 Chute et al. ................ 280/643
3,704,025 A * 11/1972 Cerveny et al. ............ 280/643
4,542,915 A * 9/1985 Wheeler et al. ............ 280/642
4,907,818 A * 3/1990 Chai .......................... 280/642
5,388,853 A * 2/1995 Lauro ......................... 280/642
6,331,013 B2 * 12/2001 Choi et al. .................. 280/647
6,776,433 B2 * 8/2004 Harrison et al. ............ 280/647

* cited by examiner

*Primary Examiner*—Christopher P. Ellis
*Assistant Examiner*—Bridget Avery
(74) *Attorney, Agent, or Firm*—Alan D. Kamrath; Nikolai & Mersereau, P.A.

(57) ABSTRACT

A portable folding wheelchair includes a front U-shaped tube and a rear U-shaped tube pivotally coupling with each other through a pin to form a X-shape. The front U-shaped tube has an upper end on two sides to fasten to a connection plate. The connection plate connects to a backrest. The front U-shaped tube has a lower section on two sides to pivotally engage with an upright tube. The upright tube and the rear U-shaped tube have an upper end bridging a sleeve. The wheelchair has a simple structure and may be folded in forward, rearward, upward and downward directions to become a smaller size to facilitate carrying or storing in a car to enable disabled people to use in travels and trips.

5 Claims, 3 Drawing Sheets

PORTABLE FOLDING WHEELCHAIR

BACKGROUND OF THE INVENTION

1. Field of the Invention

The invention relates to a rehabilitative wheelchair.

2. Description of the Prior Art

With increasing advances of social welfare and people's living standards, more and more disabled people use rehabilitative wheelchairs. They offer great conveniences to the indoor and outdoor activities of the disabled people, and improve life quality of the disabled people. However, the wheelchairs now on the market are quite bulky. Although most of the wheelchairs have folding structures, they usually are for folding in the left and right directions. After folding, the size is still very big, and is not portable or difficult to carry with hands or by cars. It becomes a big constraint for the disabled people in travel or trip.

SUMMARY OF THE INVENTION

The object of the invention is to provide a portable folding wheelchair that has a simpler structure and may be folded forwards and rearwards, and upwards and downwards. It has a smaller size after folding and may be carried easily with hands or by cars to enable disabled people to use conveniently in travels and trips anytime and anywhere.

The portable folding wheelchair according to the invention includes a seat frame and a backrest. The seat frame includes a front U-shaped tube and a rear U-shaped tube coupling with each other in the middle section on two sides through a pin to form a X-shape from sideward. The front U-shaped tube and the rear U-shaped tube have respectively an upward opening. The rear U-shaped tube has a lower end on two sides to couple with a rear wheel. The front U-shaped tube has an upper end on two sides to fasten to a connection plate. The connection plate connects to the backrest. The front U-shaped tube has a lower section on two sides to pivotally engage with an upright tube. The upright tube has a lower end coupling with a front wheel. The upright tube and the rear U-shaped tube have an upper end bridging a sleeve. The sleeve has a front end forming a notch. The upper end of the upright tube is pivotally engaged with the notch through a pin. The sleeve has an opening formed on a lower section in the longitudinal direction to allow the sleeve to couple with the upper end of the rear U-shaped tube. The two lateral sides of the middle section of the sleeve have respectively a slot to couple with a bolt to engage with the rear U-shaped tube. The outer side of the rear section of the sleeve has a flap extending outwards. The rear U-shaped tube has a retaining pin corresponding to the flap. The upper ends of the two upright tubes are bridged by a front stretcher. The two connection plates are bridged by a rear stretcher. The front stretcher and the rear stretcher are coupled with a seat canvas.

In another aspect, the portable folding wheelchair of the invention includes a seat frame and a backrest. The seat frame includes a front U-shaped tube and a rear U-shaped tube coupling with each other in the middle through a pin to form a X-shape from sideward. The front U-shaped tube and the rear U-shaped tube have respectively an upward opening. The rear U-shaped tube has a lower end on two sides to couple with a rear wheel. The front U-shaped tube has an upper end on two sides to fasten to a connection plate. The connection plate connects to the backrest. The front U-shaped tube has a lower section on two sides to pivotally engage with an upright tube. The upright tube has a lower end coupling with a front wheel. The upright tube and the rear U-shaped tube have an upper end bridging a sleeve. The sleeve has a front end forming a notch. The upper end of the upright tube is pivotally engaged with the notch through a pin. The sleeve has an opening formed on a lower section in the longitudinal direction to allow the sleeve to couple with the upper end of the rear U-shaped tube. The two lateral sides of the middle section of the sleeve have respectively a slot to couple with a bolt to engage with the rear U-shaped tube. The outer side of the rear section of the sleeve has a flap extending outwards. The rear U-shaped tube has a retaining pin corresponding to the flap. The upper ends of the two upright tubes are bridged by a front stretcher. The two connection plates are bridged by a rear stretcher. The front stretcher and the rear stretcher are coupled with a seat canvas. The backrest includes a U-shaped handle tube which has an opening directing downwards. The U-shaped handle tube is coupled with a transverse backrest canvas. The U-shaped handle tube has two sides each has a lower end pivotally engaging with the connection plate through a pin. The U-shaped handle tube further has an anchor pin located on a lower section on two sides. The anchor pin has a bigger head and screw threads formed on a rear section. The two anchor pins are coupled respectively with a spring, then run through the U-shaped handle tube from outside to fasten to two ends of a rope. The connection plate has an anchor hole located above the pivotal connection point of the pin. The head of the anchor pin may be wedged in the anchor hole.

In yet another aspect, the portable folding wheelchair of the invention further includes a seat frame and a backrest. The seat frame includes a front U-shaped tube and a rear U-shaped tube coupling with each other in the middle through a pin to form a X-shape from sideward. The front U-shaped tube and the rear U-shaped tube have respectively an upward opening. The rear U-shaped tube has a lower end on two sides to couple with a rear wheel. The front U-shaped tube has an upper end on two sides to fasten to a connection plate. The connection plate connects to the backrest. The front U-shaped tube has a lower section on two sides to pivotally engage with an upright tube. The upright tube has a lower end coupling with a front wheel. The upright tube and the rear U-shaped tube have an upper end bridging a sleeve. The sleeve has a front end forming a notch. The upper end of the upright tube is pivotally engaged with the notch through a pin. The sleeve has an opening formed on a lower section in the longitudinal direction to allow the sleeve to couple with the upper end of the rear U-shaped tube. The two lateral sides of the middle section of the sleeve have respectively a slot to couple with a bolt to engage with the rear U-shaped tube. The outer side of the rear section of the sleeve has a flap extending outwards. The rear U-shaped tube has a retaining pin corresponding to the flap. The upper ends of the two upright tubes are bridged by a front stretcher. The two connection plates are bridged by a rear stretcher. The front stretcher and the rear stretcher are coupled with a seat canvas. The backrest includes a U-shaped handle tube which has an opening directing downwards. The U-shaped handle tube is coupled with a transverse backrest canvas. The U-shaped handle tube has two sides each has a lower end pivotally engaging with the connection plate through a pin. The U-shaped handle tube further has an anchor pin located on a lower section on two sides. The anchor pin has a bigger head and screw threads formed on a rear section. The two anchor pins are coupled respectively with a spring, then run through the U-shaped handle tube from outside to fasten to two ends of a rope. The connection plate has an anchor hole located above the pivotal connection point of the pin. The head of the anchor pin may be wedged in the anchor hole. The two sides of the U-shaped handle tube further have respectively a U-shaped dock which has an opening directly forwards. The U-shaped dock has a lower section pivotally coupled with the U-shaped handle tube through a pin. The U-shaped dock has an outer side to anchor an armrest. The front U-shaped tube has a lower section with the inner sides thereof to pivotally couple with a U-shaped foot pedal. The U-shaped foot pedal has an opening directing rearwards. The seat canvas has a rear end with a handle attached thereon.

The invention provides the following advantages:

1. Most elements of the invention are pivotally coupled through pins and have anchor means for positioning and anchoring. For folding, first, collapse and fold the front U-shaped tube and the rear U-shaped tube in the forward and rearward direction, then turn the U-shaped foot pedal and the armrest upwards, and finally turn the U-shaped handle tube downwards to fold the whole wheelchair in a smaller size. Users can easily carry or put the folded wheelchair into a car through the handle located on the rear end of the seat canvas.
2. The rear U-shaped tube and the upright tube are bridged by a sleeve on the upper ends thereof. The sleeve provides an interval between the rear U-shaped tube and the upright tube to facilitate folding of the wheelchair. It also gives the rear U-shaped tube an anchoring support after the wheelchair is extended (with the flap pressing the retaining pin) to ensure that the wheelchair may be folded neatly and also may be extended for use securely.
3. The invention has a rope anchoring mechanism located between the U-shaped handle tube and the connection plates. When the wheelchair is extended, the anchor pin is wedged in the anchor hole to erect the backrest in the upright position. When the wheelchair is folding, pull the rope to remove the anchor pin from the anchor hole, the U-shaped handle tube may be turned downwards for folding. It is convenient to use.
4. The invention further provides a U-shaped foot pedal on a lower section between the inner sides of the front U-shaped tube, and armrests on two sides of the U-shaped handle tube. Hence disabled people may sit on the portable folding wheelchair of the invention with great comfort as sitting on a rehabilitative wheelchair.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
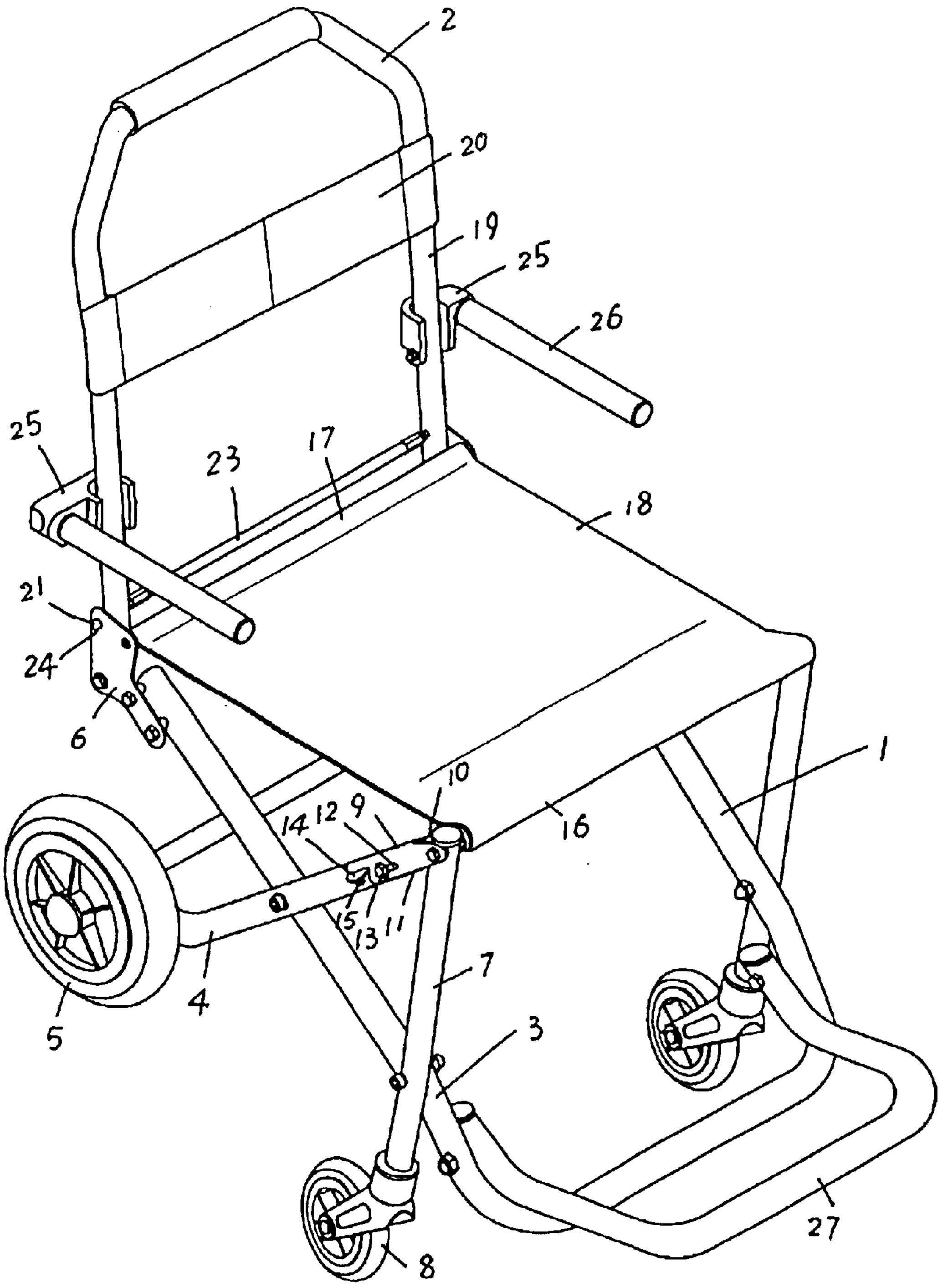
FIG. 1 is a perspective view of the invention.
Figure 2:
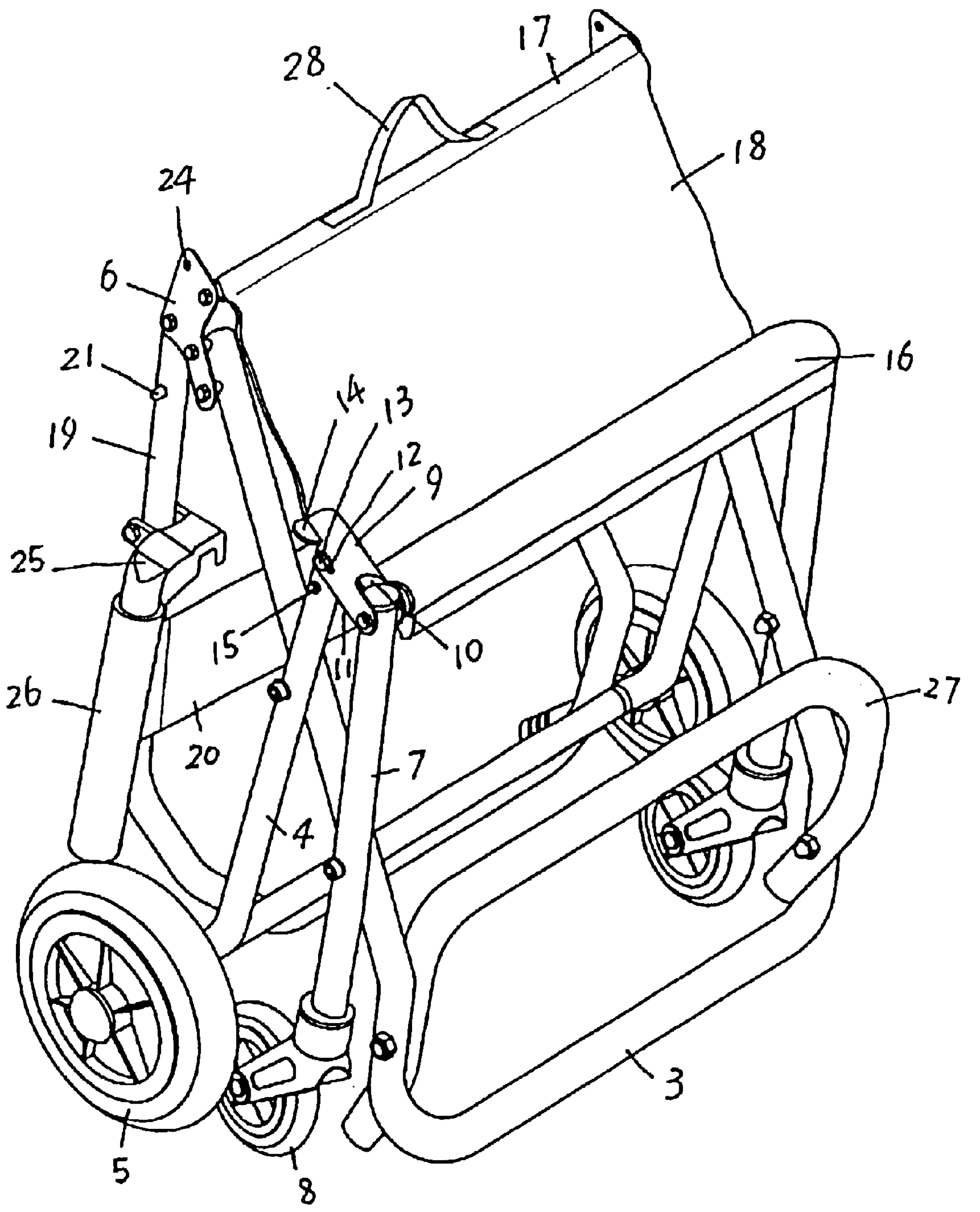
FIG. 2 is a schematic view of the invention after folding.
Figure 3:
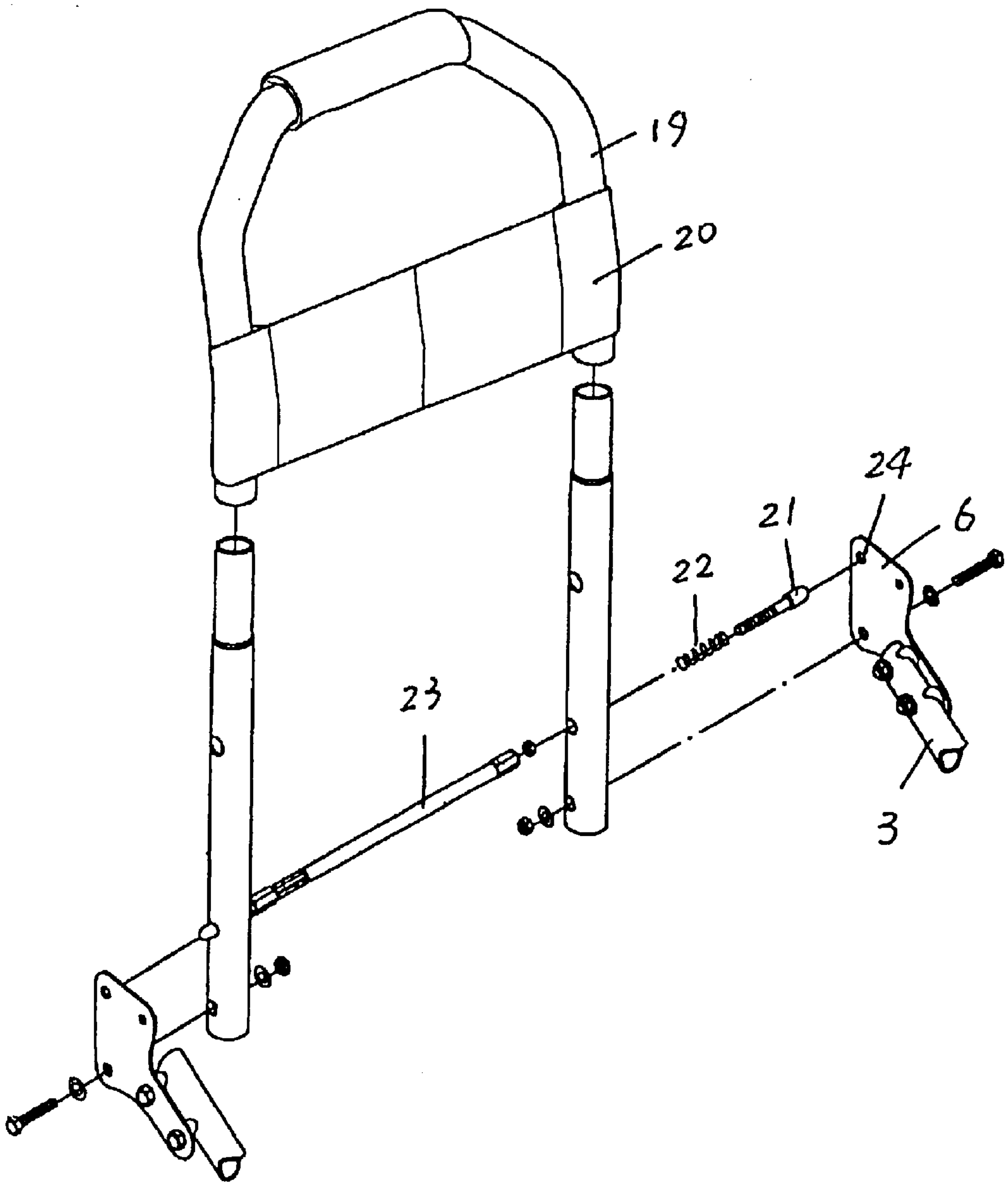
FIG. 3 is an exploded view of the backrest of the invention.

Referring to FIGS. 1, 2 and 3, the portable folding wheelchair of the invention includes a seat frame 1 and a backrest 2. The seat frame 1 includes a front U-shaped tube 3 and a rear U-shaped tube 4 coupling with each other in the middle section on two sides through a pin to form a X-shape from sideward. The front U-shaped tube 3 and the rear U-shaped tube 4 have respectively an upward opening. The rear U-shaped tube 4 has a lower end on two sides to couple with a rear wheel 5. The front U-shaped tube 3 has an upper end on two sides to fasten to a connection plate 6. The connection plate 6 connects to the backrest 2. The front U-shaped tube 3 has a lower section on two sides to pivotally engage with an upright tube 7. The upright tube 7 has a lower end coupling with a front wheel 8 which is the direction wheel. The upright tube 7 and the rear U-shaped tube 4 have an upper end bridging a sleeve 9. The sleeve 9 has a front end forming a notch 10. The upper end of the upright tube 7 is pivotally engaged with the notch 10 through a pin. The sleeve 9 has an opening 11 formed on a lower section in the longitudinal direction to allow the sleeve 9 to couple with the upper end of the rear U-shaped tube 4. The two lateral sides of the middle section of the sleeve 9 have respectively a slot 12 to couple with a bolt 13 to engage with the rear U-shaped tube 4. The outer side of the rear section of the sleeve 9 has a flap 14 extending outwards. The rear U-shaped tube 4 has a retaining pin 15 corresponding to the flap 14. The upper ends of the two upright tubes 7 are bridged by a front stretcher 16. The two connection plates 6 are bridged by a rear stretcher 17. The front stretcher 16 and the rear stretcher 17 are coupled with a seat canvas 18. The seat canvas 18 has a rear end with a handle 19 attached thereon. The backrest 2 includes a U-shaped handle tube 19 which has an opening directing downwards. The U-shaped handle tube 19 is coupled with a transverse backrest canvas 20. The U-shaped handle tube 19 has two sides each has a lower end pivotally engaging with the connection plate 6 through a pin. The U-shaped handle tube 19 further has an anchor pin 21 located on a lower section on two sides. The anchor pin 21 has a bigger head and screw threads formed on a rear section. The two anchor pins 21 are coupled respectively with a spring 22, then run through the U-shaped handle tube 19 from outside to fasten to two ends of a rope 23. The rope 23 has a steel core which is covered by a plastic tube on the outside. The connection plate 6 has an anchor hole 24 located above the pivotal connection point of the pin of the U-shaped handle tube 19. The head of the anchor pin 21 may be wedged in the anchor hole 24. The two sides of the U-shaped handle tube 19 further have respectively a U-shaped dock 25 which has an opening directly forwards. The U-shaped dock 25 has a lower section pivotally coupled with the U-shaped handle tube 19 through a pin. The U-shaped dock 25 has an outer side to anchor an armrest 26. The front U-shaped tube 3 has a lower section with inner sides to pivotally couple with a U-shaped foot pedal 27. The U-shaped foot pedal 27 has an opening directing rearwards.

Most elements of the invention are pivotally coupled through pins and have anchor means for positioning and anchoring. For folding, first, collapse and fold the front U-shaped tube 3 and the rear U-shaped tube 4 in the forward and rearward direction, then turn the U-shaped foot pedal 27 and the armrest 26 upwards, and finally turn the U-shaped handle tube 19 downwards to fold the whole wheelchair in a smaller size. Users can easily carry or put the folded wheelchair into a car through the handle 28 located on the rear end of the seat canvas 18.

In addition, the rear U-shaped tube 4 and the upright tube 7 are bridged by the sleeve 9 on the upper ends thereof. The sleeve 9 provides an interval between the rear U-shaped tube 4 and the upright tube 7 to facilitate folding of the wheelchair. It also gives the rear U-shaped tube 4 an anchoring support after the wheelchair is extended (with the flap pressing the retaining pin) to ensure that the wheelchair may be folded neatly and also may be extended for use securely.

Moreover, the invention has a rope anchoring mechanism located between the U-shaped handle tube 19 and the connection plates 6. When the wheelchair is extended, the anchor pin 21 is wedged in the anchor hole 24 to erect the backrest 2 in the upright position. When the wheelchair is folding, pull the rope 23 to remove the anchor pin 21 from the anchor hole 24, the U-shaped handle tube 19 may be turned downwards for folding. It is convenient to use.

Furthermore, the invention provides a U-shaped foot pedal 27 on a lower section between the inner sides of the front U-shaped tube 3 and armrests 26 on two sides of the U-shaped handle tube 19. Hence disabled people may sit on the portable folding wheelchair of the invention with great comfort as sitting on a rehabilitative wheelchair.

What is claimed is:

1. A portable folding wheelchair comprising a seat frame and a backrest, wherein the seat frame includes a front U-shaped tube and a rear U-shaped tube coupling with each other in a middle section on two sides through a pin to form a X-shape from sideward, the front U-shaped tube and the rear U-shaped tube having respectively an upward opening, the rear U-shaped tube having a lower end on two sides to couple with a rear wheel, the front U-shaped tube having an upper end on two sides to fasten to a connection plate, the connection plate connecting to the backrest, the front U-shaped tube having a lower section on two sides to pivotally engage with an upright tube, the upright tube having a lower end coupling with a front wheel, the upright tube and the rear U-shaped tube having an upper end bridging a sleeve, the sleeve having a front end forming a notch, the upright tube having an upper end pivotally engaging with the notch through a pin, the sleeve further having an opening formed on a lower section in the longitudinal direction to allow the sleeve to couple with the upper end of the rear U-shaped tube, the sleeve having two lateral sides on a middle section to form respectively a slot to couple with a bolt to engage with the rear U-shaped tube, the sleeve further having a flap extending outwards from an outer side on a rear section thereof, the rear U-shaped tube having a retaining pin corresponding to the flap, the upper ends of the two upright tubes being bridged by a front stretcher, the two connection plates being bridged by a rear stretcher, the front stretcher and the rear stretcher being coupled with a seat canvas.

2. The portable folding wheelchair of claim 1, wherein the backrest includes a U-shaped handle tube which has an opening directing downwards, the U-shaped handle tube being coupled with a transverse backrest canvas, the U-shaped handle tube having two sides, each has a lower end pivotally engaging with the connection plate through a pin, the U-shaped handle tube further having an anchor pin located on a lower section on two sides, the anchor pin having a bigger head and screw threads formed on a rear section, the two anchor pins being coupled respectively with a spring and running through the U-shaped handle tube from an outer side of said handle tube to fasten to two ends of a rope, the connection plate having an anchor hole located above the pivotal connection point of the pin of the U-shaped handle tube, the head of the anchor pin being allowed to wedge in the anchor hole.

3. The portable folding wheelchair of claim 1, wherein two sides of the U-shaped handle tube are fastened respectively to a U-shaped dock which has an opening directing forwards, the U-shaped dock having a lower section pivotally coupled with the U-shaped handle tube through a pin, the U-shaped dock having an outer side to anchor an armrest.

4. The portable folding wheelchair of claim 1, wherein the front U-shaped tube has a lower section with inner sides pivotally coupling with a U-shaped foot pedal, the U-shaped foot pedal having an opening directing rearwards.

5. The portable folding wheelchair of claim 1, wherein the seat canvas has a rear end attaching to a handle.

* * * * *